Oct. 19, 1971  D. O. TAYLOR  3,613,181

SNAP FASTENER SOCKET

Filed Aug. 26, 1970

INVENTOR
Donald O. Taylor.
BY Willets Hooper
ATTORNEY

3,613,181
SNAP FASTENER SOCKET
Donald O. Taylor, Waterbury, Conn., assignor to Scovill
 Manufacturing Company, Waterbury, Conn.
Filed Aug. 26, 1970, Ser. No. 67,065
Int. Cl. A44b *17/00*
U.S. Cl. 24—216                                                    1 Claim

ABSTRACT OF THE DISCLOSURE

A plastic socket has an outward and doubled back extension which gives a husky appearance without sacrificing reliable snap action. The socket is a cup shaped member having an inward rib about its mouth and a flange extending outward about the mouth and downward thereby concealing a portion of the socket.

---

The present invention relates to a snap fastener socket molded of plastic.

In the plastic snap fastener socket parts in the prior art, there has been a definite need for a plastic socket which may be secured by a metal part to its foundation and which provides a pleasing appearance, reliable snap action characteristics and uses a minimum of plastic. There has also been need for a plastic socket which may be easily fed by automatic machinery.

The present invention fills the indicated needs. Other objects will be apparent from a reading of the following specification and the drawings, all of which disclose a non-limiting example embodying the invention. In the drawings.

Figure 1:
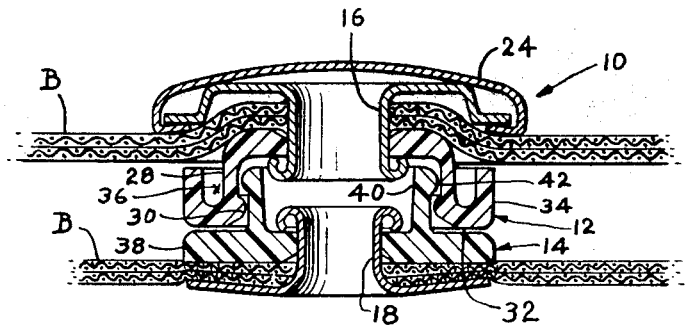
FIG. 1 is a sectional view taken through an attached snap fastener having a socket embodying the invention.

Referring more specifically to the drawings, an assembly embodying the invention is shown in FIG. 1 and indicated 10. It comprises superposed layers of foundation material B to one of which is attached a socket 12 and to the other of which is attached a stud 14 by riveted eyelets in the conventional way. Both the socket and stud members are molded of plastic and have central attached openings through which extend the attaching eyelet barrels 16, 18. A cap shell 24 covers the eyelet flange 16.

Figure 2:
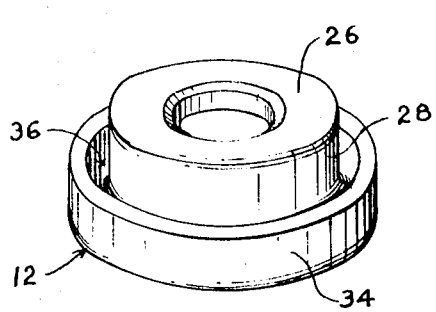
FIG. 2 is a perspective top view of a socket.
Figure 3:
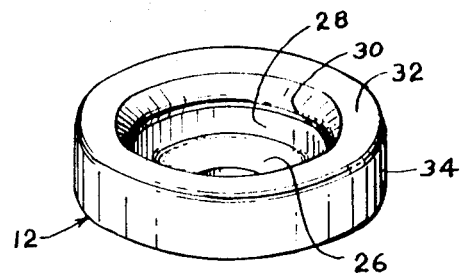
FIG. 3 is a perspective bottom view showing the mouth of the socket.

The plastic socket 12 (in the position shown in FIG. 3) comprises a cup-shaped element having a floor or base 26 and upwardly extending side walls 28 which are relatively straight. The side walls have an inward annular rib 30 about the mouth thereof. A flange 32 extends outward about the mouth of the socket and has a downturned extension 34 which is parallel to the side wall 28. An annular space 36 (FIG. 2) is disposed between the extension 34 and the wall 28.

Preferably, the downward extension 34 measures in height at least one-half the height of the side wall 28 in order to conceal the base 26 of the fastener once the socket is attached.

The stud comprises a base flange 38 from which extends upwardly an annular head 40 having an outward rib 42 about the top thereof. In operation, the stud rib 42 enters past the rib 30 of the socket in snap engagement.

Figure 4:
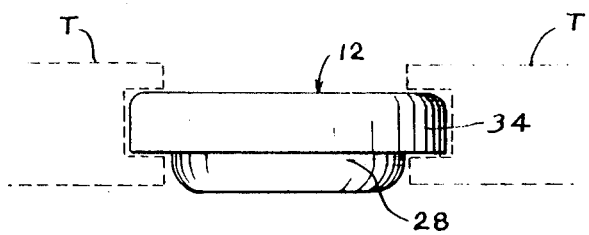
FIG. 4 is a front elevation of a socket showing feeding tracks in phantom engaging the sides thereof.

As shown in FIG. 4, the socket 12 is easily conducted along tracks T in automatic machinery by the engagement of the extension 32, 34 with the channels in the track. Despite the husky enlarged character of the extension 34, the resilience of the socket is not affected due to the provision of the annular space 36 (FIG. 1).

The invention may be described in the following claim language.

I claim:

1. A snap fastener socket molded of a single piece of plastic and comprising a cup-shaped element having a central opening in the bottom wall, relatively straight side walls having an inward rib about the mouth thereof adapted to engage resiliently the head of a mating snap fastener part, a flange extending outward about the mouth of the element and then having a downward extension parallel to and spaced from the sidewall of the cup, the downward extension measuring in height over one-half the height of the cup to substantially conceal the bottom of the cup once the socket is attached.

References Cited

UNITED STATES PATENTS

| | | | |
|---|---|---|---|
| 2,368,100 | 1/1949 | Boenecke | 24—216 |
| 2,724,884 | 11/1955 | Jones | 24—208.5 A |
| 3,006,048 | 10/1961 | Windish | 24—217 |

BERNARD A. GELAK, Primary Examiner

U.S. Cl. X.R.

24—213